Patented June 4, 1940

2,203,506

UNITED STATES PATENT OFFICE 2,203,506

NITROGEN-CONTAINING ORGANIC COMPOUND

Henry Alfred Piggott and John Donald Rose, Blackley, Manchester, England, assignors to Imperial Chemical Industries Limited, a corporation of Great Britain No Drawing. Application June 13, 1938, Serial No. 213,516. In Great Britain June 18, 1937

9 Claims. (Cl. 260—295)

The present invention relates to the manufacture of new nitrogen-containing organic compounds, which contain in their molecules at least one amine (secondary or tertiary) or one substituted ammonium group.

According to the invention a reactive ester of a hydroxyalkyl or hydroxyacyl urea, or of a hydroxyalkyl carbamate or a salt of such an ester, is caused to interact with an aliphatic (including cycloaliphatic and araliphatic) or heterocyclic amine. The new compounds are useful in the treatment of textile materials.

By the term reactive ester is meant esters of the halogen acids or aromatic sulphonic acids.

When the reactive ester is of a halogen acid the compounds used may be termed halogeno. Then, as halogenoalkyl or halogenoacyl ureas or halogenoalkyl carbamates there come to be considered chloroacetyl-urea, iodo-actetyl-urea, 2- chloroethyl-urea or 1-chloropropionyl-urea, 3-chloropropyl-urea and 2-chloroethyl carbamate.

When an aromatic sulphonic ester is used the starting material can conveniently be used without isolation so that the making of the ester and the production thence of a new compound according to the invention are effected as a one-stage operation.

As aliphatic or heterocyclic amines we may use methylamine, ethylamine, dimethylamine, diethylamine, triethylamine, benzylamine, cyclohexylamine, piperidine, N-benzylpiperidine, N-methylpiperidine, pyridine, α-picoline, quinoline or tertiary bases themselves prepared by the interaction of a halogenoalkyl- or halogenoacylurea or halogenoalkyl carbamate with a suitable secondary amine.

The invention is illustrated but not limited by the following examples in which the parts are by weight.

### Example 1

48 parts of 2-chloroethylurea hydrochloride (made by treating 2-hydroxyethylurea with thionyl chloride) are mixed with 90 parts of pyridine and the mixture is heated with stirring at 100° C. for 2 hours. On cooling the mass becomes pasty by separation of crystals. These are filtered off, washed with acetone and dried. The new compound, ureidoethylpyridinium chloride, forms colourless crystals, M. P. 164° C. when crystallized from ethyl alcohol. The following equation illustrates the reaction involved in making this new compound:

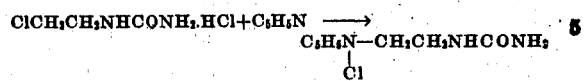

Example 2

13 parts of chloracetylurea, 50 parts of benzene and 17 parts of piperidine are heated together at 100° C. for 2 hours in a vessel fitted with a reflux condenser. From the benzene mixture, filtered hot, there separates on cooling a new compound, viz., piperidylacetyl urea, M. P. 118° C. The following equation illustrates the reaction involved in making this new compound:

Example 3

10 parts of iodoacetylurea, 3 parts of N-benzylpiperidine and 50 parts of acetone are heated together at 60–70° C. for 14 hours in a vessel fitted with a reflux condenser. A white crystalline mass separates from the mixture. This is filtered off.

The so-obtained ureidoacetyl-N-benzyl piperidinium iodide, crystallised from ethyl alcohol forms colorless crystals, M. P. 182° C. The following equation illustrates the reaction involved in making this new compound:

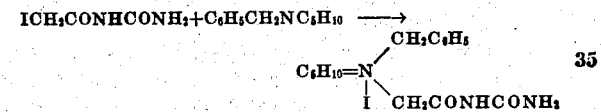

Example 4

10 parts of p-toluene sulphonyl chloride is added a little at a time to a stirred mixture of 5.2 parts of β-hydroxyethylurea and 20 parts of dry pyridine, the temperature being kept below 30° C. The mixture is then heated on the steam bath for several hours. On cooling a white, crystalline, hygroscopic solid separates. This substance is a ureidoethylpyridinium salt. The corresponding picrate, M. P. 178-9° C., is identical with the picrate derived from the ureidoethylpyridinium chloride of Example 1.

Example 5

25 parts of chloroacetylurea and 40 parts of pyridine are heated together for 5 hours at 100° C. in a vessel fitted with a reflux condenser. The mixture is then cooled, whereupon crystals separate from the solution. These are filtered off and dried. There is thus obtained ureido-acetylpyridinium chloride, M. P. 230° C. (with decomposition). The following equation illustrates the reaction involved in making this new compound:

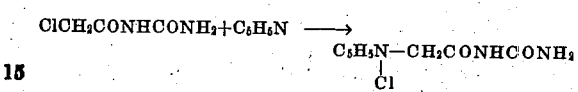

Example 6

15 parts of diethylamine, 13.6 parts of chloro-acetylurea and 50 parts of benzene are heated together for 1 hour at 100° C. in a vessel fitted with a reflux condenser. The mixture is filtered hot and then allowed to cool, whereupon crystals separate out. There is thus obtained diethyl-aminoacetylurea, M. P. 100° C. The following equation illustrates the reaction involved in making this new compound:

ClCH₂CONHCONH₂ + (C₂H₅)₂NH →
(C₂H₅)₂NCH₂CONHCONH₂

Example 7

To a solution of γ-chloropropylurea (prepared as described below) 50 parts of pyridine are added and the mixture is heated at 100° C. for 1 hour. The mixture is then allowed to stand at room temperature for several hours, during which time a resinous substance separates out from the solution. The pyridine is removed by decantation and the resinous substance is well washed with acetone, whereupon it solidifies to a white solid. There is thus obtained γ-ureidopropylpyridinium chloride, which, after recrystallisation from ethanol, has M. P. 170° C. The following equation illustrates the reaction involved in making this new compound:

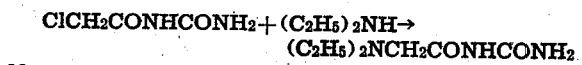

The solution of γ-chloropropylurea referred to is conveniently prepared as follows:

15 parts of γ-aminopropanol and 200 parts of water are heated to 60° C. and 25 parts of nitrourea are gradually added. Effervescence occurs, and a gas is evolved. When the effervescence has ceased the clear solution so obtained is boiled under a reflux condenser for 2 hours. The water is then removed by evaporation under diminished pressure. To the γ-hydroxypropylurea so obtained, 28 parts of thionyl chloride are gradually added, the mixture being contained in a vessel provided with an external cooling jacket and with a reflux condenser. A violent reaction occurs. When this has ceased the mixture is heated to 100° C. for 30 minutes. There is thus obtained a solution containing γ-chloropropylurea, which is further treated as described above.

Example 8

10 parts of chloroethyl carbamate and 10 parts of pyridine are heated together at 100° C. for 10 hours in a vessel fitted with a reflux condenser. A white crystalline solid separates out from the mixture. This is filtered off and dried. There is thus obtained carbamyloxyethyl-pyridinium chloride of the formula C₅H₅N(Cl)—CH₂—CH₂—O—CO—NH₂ in the form of white crystals. These, when recrystallised from ethanol, have M. P. 122° C.

Example 9

40 parts of β-chloroethylurea hydrochloride (made from β-hydroxyethylurea and thionyl chloride) and 100 parts of triethylamine are heated together at 100° C. for 5 hours in a vessel fitted with a reflux condenser. The mixture is then cooled, whereupon white crystals separate from the liquid. These are filtered off. There is thus obtained β-ureidoethyltriethylammonium chloride in the form of white hygroscopic crystals. The following equation illustrates the reaction involved in making this new compound:

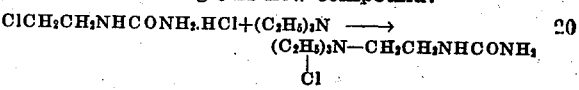

Example 10

4 parts of piperidylacetylurea (made as described in Example 2), 3 parts of chloroacetyl-urea and 50 parts of toluene are heated together at 100° C. for 3 hours. The mixture is then cooled, whereupon a yellow gummy solid separates from the solution. The toluene is decanted off and the gummy solid is dissolved in 40 parts of boiling ethanol. The ethanol solution is then cooled, whereupon bis-(ureidoacetyl)-piperidinium chloride separates out in the form of white hygroscopic crystals. The following equation illustrates the reaction involved in making this new compound:

C₅H₁₀NCH₂CONHCONH₂ + ClCH₂CONHCONH₂ →
C₅H₁₀=N=(CH₂CONHCONH₂)₂
|
Cl

We claim:

1. Quaternary ammonium urea derivatives having the general formula:

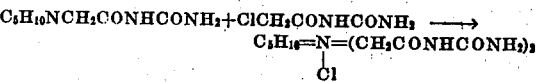

in which formula the group

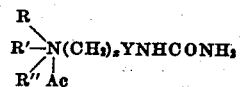

as a whole represents the entire molecular structure of a heterocyclic tertiary amine, Ac denotes an anion; x represents one of the numbers 1, 2, and 3; and Y denotes a bridging group selected from the category consisting of

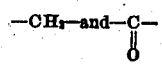

2. Quaternary ammonium urea derivatives having the general formula:

C₅H₅N—CH₂—Y—NHCONH₂
|
Ac in which formula the group C₅H₅N- as a whole represents the entire molecular structure of pyridine, Ac denotes an anion, and Y denotes a bridging group selected from the category consisting of

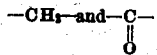

3. Nitrogen-containing organic compounds selected from the group consisting of tertiary amino urea derivatives having the formula:

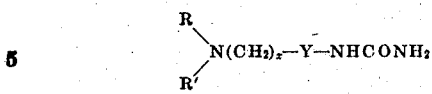

in which the group

as a whole represents the radical of a secondary amine selected from the class consisting of dialkyl amines and secondary heterocyclic bases which contain but a single nitrogen atom in the hetero-cyclic ring, $x$ represents one of the numbers 1, 2, and 3; and Y denotes a bridging group selected from the category consisting of

and quaternary ammonium urea derivatives having the formula:

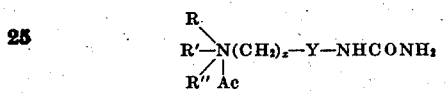

in which the group

as a whole represents the entire molecular structure of a tertiary amine selected from the class consisting of trialkyl amines and tertiary heterocyclic bases which contain but a single nitrogen atom in the hetero-cyclic ring, Ac denotes an anion; $x$ represents one of the numbers 1, 2, and 3; and Y denotes a bridging group selected from the category consisting of

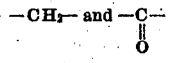

4. Quaternary ammonium urea derivatives having the formula:

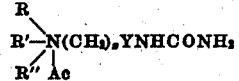

in which formula the group

as a whole represents the entire molecular structure of a tertiary amine selected from the class consisting of trialkyl amines and tertiary heterocyclic bases which contain but a single nitrogen atom in the heterocyclic ring, Ac denotes an anion; $x$ represents one of the numbers 1, 2, and 3; and Y denotes a bridging group selected from the category consisting of

5. Quaternary ammonium urea derivatives having the formula:

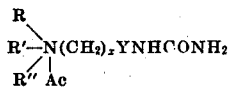

in which formula the group

as a whole represents the entire molecular structure of a heterocyclic tertiary amine that contains but a single nitrogen atom in the heterocyclic ring, Ac denotes an anion; $x$ represents one of the numbers 1, 2, and 3; and Y denotes a bridging group selected from the category consisting of

6. Quaternary ammonium urea derivatives having the formula:

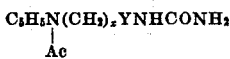

in which formula the group $C_5H_5N-$ as a whole represents the entire molecular structure of pyridine, Ac denotes a halide atom, $x$ represents on of the numbers 1, 2, and 3, and Y denotes a bridging group selected from the category consisting of

7. Ureidoethylpyridinium chloride.
8. Ureidopropylpyridinium chloride.
9. Chlor-pyridinium acetyl urea.

HENRY ALFRED PIGGOTT.
JOHN DONALD ROSE.